July 21, 1925.  1,547,148
K. E. PEILER
METHOD AND APPARATUS FOR REHEATING GLASS PARISONS
Filed Nov. 5, 1924
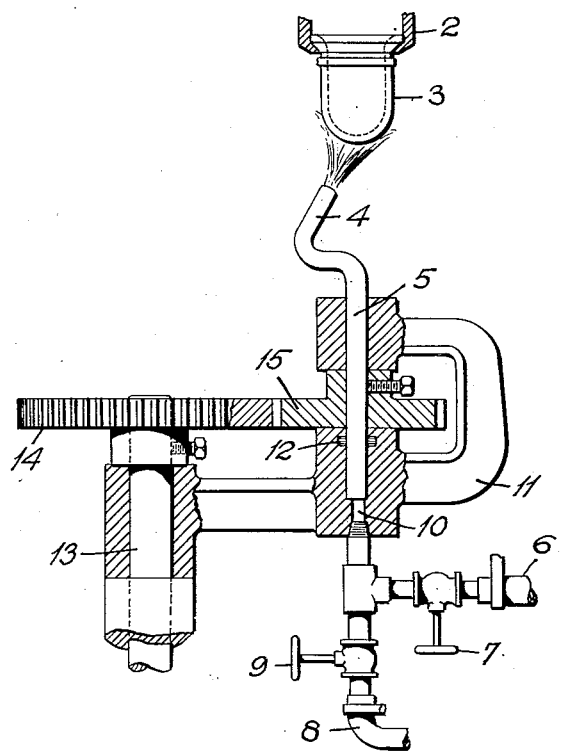
Witness:
S. S. Grotta.
Inventor:
Karl E. Peiler
by Wm H Honiss
Atty.

Patented July 21, 1925.

1,547,148

UNITED STATES PATENT OFFICE.

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE.

METHOD AND APPARATUS FOR REHEATING GLASS PARISONS.

Application filed November 5, 1924. Serial No. 747,973.

*To all whom it may concern:*

Be it known that I, KARL E. PEILER, a citizen of United States, residing at West Hartford, in the county of Hartford and State of Connecticut, have invented certain new and useful Improvements in Methods and Apparatus for Reheating Glass Parisons, of which the following is a specification.

My invention relates to the manufacture of blown glassware by the system in which a blank or parison is produced and is then expanded to its final form in a blow-mold.

One object of my invention is to provide an improved method for re-heating glass parisons, preparatory to the final blowing operation.

Another object of my invention is to provide simple and effective apparatus for carrying out the above-indicated method.

When a mass of molten glass is formed into a blank or parison before being expanded to its final form, the walls of the parison become chilled, and it is necessary to restore the plasticity of the chilled walls of the parison to a greater or lesser extent before the final blowing operation. Sometimes the internal heat of the parison is relied upon to produce this re-heating, but in other cases it is necessary to re-heat the parisons by external means. When such external heating is employed, it is important that the parison be re-heated evenly on all sides, in order that the glass may be distributed evenly when expanded in the blow mold.

According to my present invention, I produce the even re-heating just mentioned, by causing a flame to impinge upon the outer surface of the parison, and causing the flame to revolve around the central axis of the parison, thereby insuring that all parts of the parison shall be symmetrically heated. Also, any dynamic effect which may be exerted on the glass by the flame is uniformly distributed on all sides of the parison. By this method I avoid the necessity of a complicated mechanism for rotating the parison support, which is an important consideration in machines having a considerable number of parison heads or spindles such as are used for the manufacture of bulbs for incandescent electric lamps. My improved method also permits the use of a single burner of simple construction.

The figure of the accompanying drawing is a vertical sectional view of a burner constructed in accordance with my invention, as used in the re-heating of parisons for lamp bulbs.

In the drawing, the numeral 2 indicates a portion of a parison support, which in the present instance is one of the blank spindles of a lamp bulb machine, and which, as shown, supports a glass parison 3.

A burner having a nozzle 4 is mounted below the parison support 2, and the burner nozzle is arranged to revolve around the vertical axis of the parison 3. For this purpose the nozzle 4 is off-set with respect to the vertical portion 5 of the burner tube, and is suitably inclined to direct its flame upon the parison 3.

The burner is supplied with an adjustable mixture of air and gas, through a mixer, which is shown somewhat conventionally as including a gas supply pipe 6 controlled by a valve 7, and an air supply pipe 8, controlled by a valve 9. The combustion mixture is conducted to the burner tube 5 through a channel 10 formed in a support 11 in which the vertical portion 5 of the burner tube is journaled for rotation. A suitable stuffing box 12 may be employed for preventing leakage between the channel 10 and the burner tube 5.

The burner tube is rotated at the desired speed by power supplied from a shaft 13, through a gear 14 secured to the shaft 13 and meshing with a gear 15 secured to the burner tube 5.

In the operation of the apparatus described above, the parison support 2 and the burner are brought into the relation shown in the drawing by any suitable mechanism, which forms no part of my present invention and which, therefore, is not shown therein. The rotation of the burner tube 5 causes the nozzle 4 to revolve around the central axis of the parison, thereby heating the parison symmetrically on all sides.

This invention is well adapted for use in connection with the method and apparatus for making bulbs for incandescent electric lamps which is described and claimed in the co-pending application of Robert W. Canfield, filed May 19, 1925, Serial No. 31,315.

In a related application, filed Nov. 18, 1924, Serial No. 750,544, I have disclosed an upwardly directed spinning flame in the periodic production of mold charges of molten glass.

I have selected for illustration in the drawing a simple form of burner, but it will be understood that, while this construction is well suited for carrying out my invention, numerous other types of burners may be employed.

It will also be understood that my invention is not restricted to the re-heating of parisons for incandescent electric lamps, but may be applied also to re-heating blanks for tumblers, jars, bottles, or any other hollow glass-ware.

While my invention has been described specifically with relation to the heating of glass parisons, its principles may also be employed in heating glass articles other than parisons; for example, in heating the edges of hollow glass articles preparatory to neck finishing. It will, therefore, be understood that no limitations are to be imposed upon my invention, except such as are indicated in the appended claims.

I claim as my invention:

1. The method of re-heating a glass article, that comprises causing a flame to revolve around the said article and in contact therewith.

2. The method of re-heating a glass parison, that comprises causing a flame to revolve around the parison and in contact therewith.

3. The method of re-heating a glass parison, that comprises suspending the parison from above and causing a flame to revolve around the parison and in contact therewith.

4. The method of re-heating a glass parison, that comprises causing a flame to revolve in contact with said parison, about an axis substantially in central alignment with said parison.

5. The method of re-heating a glass parison, that comprises suspending the parison from above and causing a flame to revolve in contact with said parison, about an axis substantially in central alignment with said parison.

6. The method of re-heating a glass parison, that comprises suspending the parison from above, directing a flame laterally upon said parison, and revolving said flame around an axis substantially in central alignment with said parison while maintaining said flame in contact with said parison.

7. The method of re-heating a glass parison, that comprises directing upon the parison a flame inclined upwardly toward the said parison, and revolving the said flame upon a vertical axis substantially in alignment with the central vertical axis of the said parison.

8. Apparatus for re-heating glass articles, comprising a support for the article to be re-heated, a burner, and means for revolving said burner around a central axis of an article carried by said burner.

9. Apparatus for re-heating glass parisons, that comprises a parison support, a burner beneath the said support, and means for revolving said burner around the central vertical axis of the parison carried by said support.

10. Apparatus for re-heating glass parisons, comprising a parison support, a burner beneath said support and having a nozzle inclined upwardly toward said support, and means for revolving said burner nozzle around a vertical axis in substantial alignment with the central vertical axis of a parison carried by said support.

11. A glass-working burner comprising a flame-discharging nozzle, and means for revolving said nozzle.

12. A glass-working burner comprising a flame-discharging nozzle, and means for revolving said nozzle around an axis exterior to said nozzle.

13. A glass-working burner comprising a flame-discharging nozzle, and means for revolving said nozzle around an axis inclined with respect to said nozzle.

14. A glass-working burner comprising a flame-discharging nozzle, a rotatable support for said nozzle, and gearing for rotating said support.

15. A glass-working burner comprising a support, a vertical burner tube rotatably mounted in said support, gearing for rotating the said tube, means for supplying a combustion mixture to the interior of said tube, and an inclined nozzle communicating with the said tube and off-set with respect thereto.

Signed at Hartford, Conn., this 4th day of November, 1924.

KARL E. PEILER.